Patented Feb. 17, 1925.

1,526,982

UNITED STATES PATENT OFFICE.

EDWARD W. HILL, OF CHICAGO, ILLINOIS, ASSIGNOR TO A. B. DICK COMPANY, OF CHICAGO, ILLINOIS, A CORPORATION OF ILLINOIS.

STENCIL SHEET.

No Drawing.    Application filed April 7, 1922.   Serial No. 550,294.

*To all whom it may concern:*

Be it known that I, EDWARD W. HILL, a citizen of the United States, residing at Chicago, in the county of Cook and State of Illinois, have invented certain new and useful Improvements in Stencil Sheets, of which the following is a specification.

Originally stencil-sheets adapted for the reduplication of typewritten matter were produced by coating an open-texture, porous base with soft wax. With sheets so made, only a limited number of copies could be produced. In addition, the sheets were fragile, easily injured and affected by changes of temperature. To a great extent such sheets were later superseded by so-called "indestructible" stencil-sheets, in which a base of open-texture, porous material was coated with coagulated protein, as, for example, gelatin combined with a tempering agent, such as sugar or glycerin, and treated with a suitable coagulant, such as potassium dichromate, formaldehyde, etc. If stencil-sheets of this character, which are now in extensive use, are stencilized a substantial period after the coating of the base, they will be too brittle and it is necessary to temporarily soften the coating material by the application of moisture.

The object of the present invention is to produce a stencil-sheet which shall improve upon the existing art in divers respects, chiefly, however, in dispensing with the necessity for temporary moistening of the stencil-sheet during the stencilizing operation. To attain this end, I have devised a coating or impregnating material characteristically different from anything which has heretofore been developed and which, when applied to the foundation sheet, results in a stencil-sheet which is at all times ready for use by inserting the same in a writing machine and typing thereon.

In carrying out the invention, I employ a base of open-texture, porous material of any suitable character, such, for example, as the Japanese bibulous paper commonly known as "Yoshino". This I coat or impregnate with a cellulose ester, such as cellulose nitrate or cellulose acetate, by treating the paper with a solution of such cellulose ester in a suitable solvent. The material which I prefer to employ and with which excellent results may be obtained is known as "pyroxylin enamel", this being a solution of nitrated cellulose in a suitable solvent, with which has been incorporated a pigment such as zinc oxide. As commercially available at the present time, this enamel has the consistency, approximately, of ordinary molasses. As is well known, the consistency of pyroxylin enamel is governed by the relation between the solid constituents (such as cellulose nitrate, zinc oxide etc.) and the solvent employed (such as amylacetate).

To a given quantity of this pyroxylin enamel I add a suitable proportion (fifty per centum will give good results) of a tempering agent such as an oil, mixing this thoroughly with the enamel and, if desired, adding coloring matter such as a dye or carbon black which may have been previously dissolved or suspended in amylacetate. The chief function of the tempering agent is to prevent the pyroxlin enamel from drying too hard, making the coating undersirably brittle. For this purpose I prefer to use castor oil or a similar oil having the power of forming with the cellulose ester and its solvent a homogeneous body. I may also, if desired, add a suitable quantity of a material, for example, soya bean oil, of such character as to hasten the setting of the coating mixture when applied. The quantum to be used can readily be determined with reference to the particular pyroxylin employed. I prefer to use only enough to aid in the setting of the mixture without making it undesirably moist and sticky.

I have found it advantageous also to add to the mixture a limited proportion, say five to ten per centum, by weight, of some fatty or tallow-like ingredient of either animal or vegetable origin (lard, cottolene, Chinese vegetable tallow, etc.) to serve similarly as a setting agent, but more particularly as a preservative of the proper consistency of the finished coating and to aid also in retaining the composition in the desired state of softness, fluency and displaceability.

It is apparent that when, as above directed, a coloring matter in the form of a pigment is employed it contributes not only color but also body. It is not important that it be first combined with a material which is also a solvent of the pyroxylin, as herein explained, as it may be combined with one of the other ingredients. In that case, however, more of the solvent should be added to the mixture in order to produce the proper balance between the solid constituents and the solvent, producing the desired consistency for applying the coating mixture to the porous foundation sheet.

It may be pointed out that the commercially available pyroxylins alluded to above, listed as enamels, lacquers and what not, while essentially the same in that they contain cellulose nitrate in a suitable solvent, such as amyl acetate, differ somewhat in specific details, as with respect to consistency, the particular coloring matter employed, the use of diluents or distenders and the like. These differences, so far as I know, are not of importance in carrying out this invention so long as ordinary precautions are observed to see to it that if the pyroxylin be too thick it be reduced by the addition of more solvent, as amyl acetate and the like, without, however, too far decreasing the cellulose content of the mixture as a whole. For example, the pyroxylin enamel which I have used, as above set forth, is known commercially as "Zapon lacquer enamel. No. 340," sold by the Celluloid Zapon Company of Chicago. This requires but little reducing, and such as is required may be effected in the manner above suggested, i. e., adding more of the solvent with which the coloring matter has been combined. If, because of the price of, or variation in, commercial pyroxylins, it is preferred to employ, as above suggested, the simple compound of cellulose nitrate in a solvent such as amylacetate, the cellulose content of the solution may be from five to seven or eight per cent. This may be increased or decreased as required by the character and proportions of the other ingredients added thereto.

The basic Yoshino paper may be coated with the material above described in any desired manner, as, for instance, by bringing one surface of such paper into contact with the surface of the material and drawing it over the same, draining off the excess material, if desired, by drawing the coated sheet over a wire or straight edge. If, owing, for example, to the quantum of castor oil used, the coating when set is undesirably moist, this may be readily overcome by dusting powdered soapstone or the like over the surface.

It has been found that in stencil-sheets made as above described, the coating remains throughout an extended period of time practically unchanging and, without preliminary moistening, capable of being removed or displaced, as by the blow of the type of a writing machine or by the pressure of a hand stylus, from or on the underlying foundation sheet of Yoshino, leaving the open-texture fibres of the latter practically intact for the support of the centers of loop letters, such as o, d, q, etc., the spaces, however, corresponding with the lines of the characters being substantially clear of the coating material, so as to permit the passage of ink therethrough when the sheet is used in the ordinary manner, i. e., in a stencil-duplicating machine.

In stencilizing the sheet, it is desirable to superimpose the same upon a flexible backing having a firm surface, preferably of a color or shade contrasting with that of the coating of the stencil-sheet so that as the characters are formed in the latter they may be easily read. I have also found it advantageous to produce the coating material in an opaque flat white or to color it in some light tone, such as gray or light tan and to insert a sheet of ordinary carbon paper, face upward, between the stencil-sheet and the backing. When this is done, the impact of the type not only clears the coating material from the fibres along the type lines but also colors such fibres (by means of the carbon paper) so that after the stencilizing operation has been completed the characters formed thereon may be as easily read as are those upon ordinary carbon copies. Also, if desired, double-faced carbon paper, or two single-faced sheets placed back to back, may be used, in which case the proof-reading may be done either with the stencil or with the backing or both.

It will be understood that the invention is not limited to the details above described but that it comprehends broadly a stencil sheet adapted to be converted into a stencil by pressure (as by the impact of type or stylus thereon) and having as its essentials a base, such as Yoshino, provided with a coating which includes, or is derived from, a cellulose compound or its equivalent, this being so modified as to make it substantially stable for the purpose designed and responsive to pressure for the production of stencil openings of character suitable for the passage of ink therethrough.

What I claim is:—

1. A stencil-sheet adapted for conversion into a stencil by the impact of type and the like thereon, the same comprising a base having a type-impressible coating including a cellulose compound.

2. A stencil-sheet adapted for conversion into a stencil by the impact of type and the like thereon, the same comprising a base having a type-impressible coating including a cellulose compound and a tempering agent.

3. A stencil-sheet adapted for conversion into a stencil by the impact of type and the like thereon, the same comprising a base having a type-impressible coating including a cellulose compound, a tempering agent and a fatty material.

4. A stencil-sheet adapted for conversion into a stencil by the impact of type and the like thereon, the same comprising a base having a type-impressible coating including a cellulose compound, a tempering agent and a setting agent.

5. A stencil-sheet adapted for conversion into a stencil by the impact of type and the like thereon, the same comprising a base having a coating including a soluble compound of cellulose.

6. A stencil-sheet adapted for conversion into a stencil by the impact of type and the like thereon, the same comprising a base having a coating including a soluble compound of cellulose and a tempering agent.

7. A stencil-sheet adapted for conversion into a stencil by the impact of type and the like thereon, the same comprising a base having a coating including a cellulose compound and oil.

8. A stencil-sheet adapted for conversion into a stencil by the impact of type and the like thereon, the same comprising a base having a coating including a cellulose compound and castor oil.

9. A stencil-sheet adapted for conversion into a stencil by the impact of type and the like thereon, the same comprising a base having a coating including a cellulose compound, in admixture with a tempering agent, such as castor oil, and a fatty material.

10. A stencil-sheet adapted for conversion into a stencil by the impact of type and the like thereon, the same comprising an open, porous base, such as Yoshino, having a coating including a cellulose compound.

11. A stencil-sheet adapted for conversion into a stencil by the impact of type and the like thereon, the same comprising an open, porous base, such as Yoshino, having a coating including a cellulose compound and a tempering agent.

12. A stencil-sheet adapted for conversion into a stencil by the impact of type and the like thereon, the same comprising an open, porous base, such as Yoshino, having a coating including a cellulose compound and vegetable oil.

13. A stencil-sheet adapted for conversion into a stencil by the impact of type and the like thereon, the same comprising an open, porous base, such as Yoshino, having a coating including a cellulose compound and castor oil.

14. A stencil-sheet adapted for conversion into a stencil by the impact of type and the like thereon, the same comprising an open, porous base, such as Yoshino, having a coating including a cellulose compound, in admixture with a tempering agent, such as castor oil, and a fatty material.

15. A stencil-sheet adapted for conversion into a stencil by the impact of type and the like thereon, the same comprising an open, porous base having a coating including a compound of cellulose which is soluble in a volatile solvent.

16. A stencil-sheet adapted for conversion into a stencil by the impact of type and the like thereon, the same comprising an open, porous base having a coating including a soluble compound of cellulose, and a tempering means which forms with said compound a solid, homogenous body which is type-impressible throughout an extended period of time.

17. A stencil-sheet adapted for conversion into a stencil by the impact of type and the like thereon, the same comprising an open-texture base having a coating including a cellulose ester.

18. A stencil-sheet adapted for conversion into a stencil by the impact of type and the like thereon, the same comprising an open-texture base having a coating including a cellulose ester and a tempering agent.

19. A stencil-sheet adapted for conversion into a stencil by the impact of type and the like thereon, the same comprising an open-texture base having a coating including a cellulose ester and a setting agent.

20. A stencil-sheet adapted for conversion into a stencil by the impact of type and the like thereon, the same comprising an open-texture base having a coating including a cellulose ester in admixture with a fatty material.

21. A stencil-sheet adapted for conversion into a stencil by the impact of type and the like thereon, the same comprising an open-texture base having a coating including a cellulose ester, a tempering agent and a setting agent.

22. A stencil-sheet adapted for conversion into a stencil by the impact of type and the like thereon, the same comprising an open-texture base having a coating including a cellulose ester in admixture with a tempering agent and a fatty material.

This specification signed and witnessed this 31st day of March, 1922.

EDWARD W. HILL.

Witnesses:
JOSEPH TEAL,
H. H. NUCHUN.